United States Patent [19]
Suzuki et al.

[11] Patent Number: 5,636,205
[45] Date of Patent: Jun. 3, 1997

[54] BIDIRECTIONAL LINE SWITCHED RING NETWORK CONTROL SYSTEM

[75] Inventors: Hiroyuki Suzuki; Licca Goto, both of Kawasaki, Japan

[73] Assignee: Fujitsu Limited, Kanagawa, Japan

[21] Appl. No.: 682,404

[22] Filed: Jul. 17, 1996

Related U.S. Application Data

[63] Continuation of Ser. No. 189,461, Jan. 31, 1994, abandoned.

[30] Foreign Application Priority Data

Sep. 20, 1993 [JP] Japan .................................. 5-233100

[51] Int. Cl.⁶ ................................................ H04L 1/22
[52] U.S. Cl. ................................................ 370/224
[58] Field of Search .................................. 370/13, 15, 16, 370/16.1, 85.1, 85.13, 85.12, 85.15, 94.1, 110.1; 340/825.03, 825.05, 827; 379/5; 395/182.01, 182.02

[56] References Cited

U.S. PATENT DOCUMENTS

| | | | |
|---|---|---|---|
| 4,542,496 | 9/1985 | Takeyama et al. | 370/16.1 |
| 4,677,615 | 6/1987 | Orimo et al. | 370/16.1 |
| 5,159,595 | 10/1992 | Flanagan et al. | 370/85.15 |
| 5,271,001 | 12/1993 | Hadano | 370/16 |
| 5,278,824 | 1/1994 | Kremer | 370/16.1 |
| 5,282,200 | 1/1994 | Dempsey et al. | 370/85.12 |
| 5,307,353 | 4/1994 | Yamashita et al. | 371/11.2 |
| 5,341,364 | 8/1994 | Marra et al. | 370/16.1 |
| 5,365,510 | 11/1994 | Nicholson et al. | 370/16 |

OTHER PUBLICATIONS

American National Standard Institute T1.105.01–1994, pp. 7–11, 27–29, 31–34.

*Primary Examiner*—Douglas W. Olms
*Assistant Examiner*—Chau T. Nguyen

[57] ABSTRACT

A bidirectional line switched ring BLSR network connects a plurality of nodes in a ring formed by transmission lines. In the network, in normal operation each node sends a subsequent node address contained in an APS byte of the K1 and K2 bytes in a multiplexed signal overhead to the subsequent node. When detecting a trouble of a transmission line, each node adjacent the trouble sends the address of a node normally connected thereto via the troubled line. The bidirectional line switched ring network control system provides each node with a bypass circuit for the APS byte and an address comparison circuit for comparing the address in the APS byte with a current node address. Each node closes the bypass circuit and receives the APS byte when the result of comparison proves coincident, and opens the bypass circuit and allows the passage of the APS byte when the result proves non-coincident.

15 Claims, 11 Drawing Sheets

BIDIRECTIONAL LINE SWITCHED RING NETWORK CONTROL SYSTEM

This is a continuation, of application Ser. No. 08/189,461, filed Jan. 31, 1994 abandoned.

BACKGROUND OF THE INVENTION

1. Field of the Invention

This invention relates to a bidirectional line switched ring network control system for bidirectionally transmitting signals by connecting a plurality of nodes in a ring form.

Introduction of a bidirectional line switched ring network BLSR utilizing a synchronous optical network SONET is expected. When any trouble or failure occurs in such a bidirectional line switched ring, processing must be rapidly sped up.

2. Description of the Related Art

When no trouble exists in the ring network, each of the nodes in the bidirection line switched ring network receive an APS (automatic protection switching) byte of K1 and K2 bytes of an overhead on a multiplexed signal flowing through the ring network, generates afresh a new APS byte for transmission signal and transmits it. At this time, each node adds the address of the next node, and this address is mainly constituted by the K1 byte. It also effects branching and insertion of payload, and changes to a pointer, etc., of the overhead thereby generated. When any trouble occurs in the ring network, nodes on both sides of the position of the occurrence of the trouble form a turn-back circuit for the payload, and the other nodes continue their normal operation. In this instance, message must be exchanged and the turn-back circuit must be formed between the nodes on both sides of the position of the occurrence of the trouble, while the other nodes must transmit the APS byte containing the address for this message exchange.

Normally, each node receives the APS byte. When any trouble occurs as described above, however, each node must pass the APS byte for the message exchange. Conventionally, the transmission processing of this APS byte has been carried out using software. Therefore, as the number of nodes becomes greater, the processing time accumulates and the time for relieving the trouble by forming the turn-back circuit is prolonged.

SUMMARY OF THE INVENTION

The present invention is expected to speed up the APS transmission processing as described above.

In a bidirectional line switched ring network which bidirectionally transmits a multiplexed signal by connecting a plurality of nodes by transmission lines, wherein each of the nodes sends an address contained in an APS byte using K1 and K2 bytes of an overhead on the multiplexed signal as an address of the next node at a normal time, and sends the address of a node adjacent a trouble at the time of detection of a trouble, the present invention provides a bidirectional line switched ring network control system which provides each of the nodes with a bypass circuit for controlling whether or not the APS byte described above is to be passed, and with an address comparison circuit for comparing the address contained in the APS byte with its own address, closes the bypass circuit to inhibit the passage of the APS byte when the address contained in the APS byte coincides with the its own address, but opens the bypass circuit to allow the passage of the APS byte when the addresses do not coincide.

According to the present invention, the address comparison circuit compares the address contained in the APS byte with the its own address, opens the bypass circuit to allow the passage of the APS byte when non-coincidence continues a plurality of times, such as three times, but closes the bypass circuit to inhibit the passage of the APS byte when the addresses coincide.

According to the present invention, further, each of the nodes enters an idle state during a normal time in which the APS byte is terminated and a new APS byte is generated and transmitted, a pass-through state at the time of the occurrence of the trouble in which the APS byte is passed through the bypass circuit and a switching state at the time of the occurrence of the trouble in which the APS byte is received and a turn-back circuit is formed. When the address in the APS byte at the time of detection of the trouble does not coincide with the address of its own node, each node switches its state from the idle state to the pass-through state, and when the address in the APS node at the time of the occurrence of the trouble coincides with the its own address, each node switches its state from the idle state to the switching stake.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

Before the preferred embodiments of the present invention are described, examples of the related art will be explained with reference to FIGS. 1 and 2 of the accompanying drawings.

Figure 1:
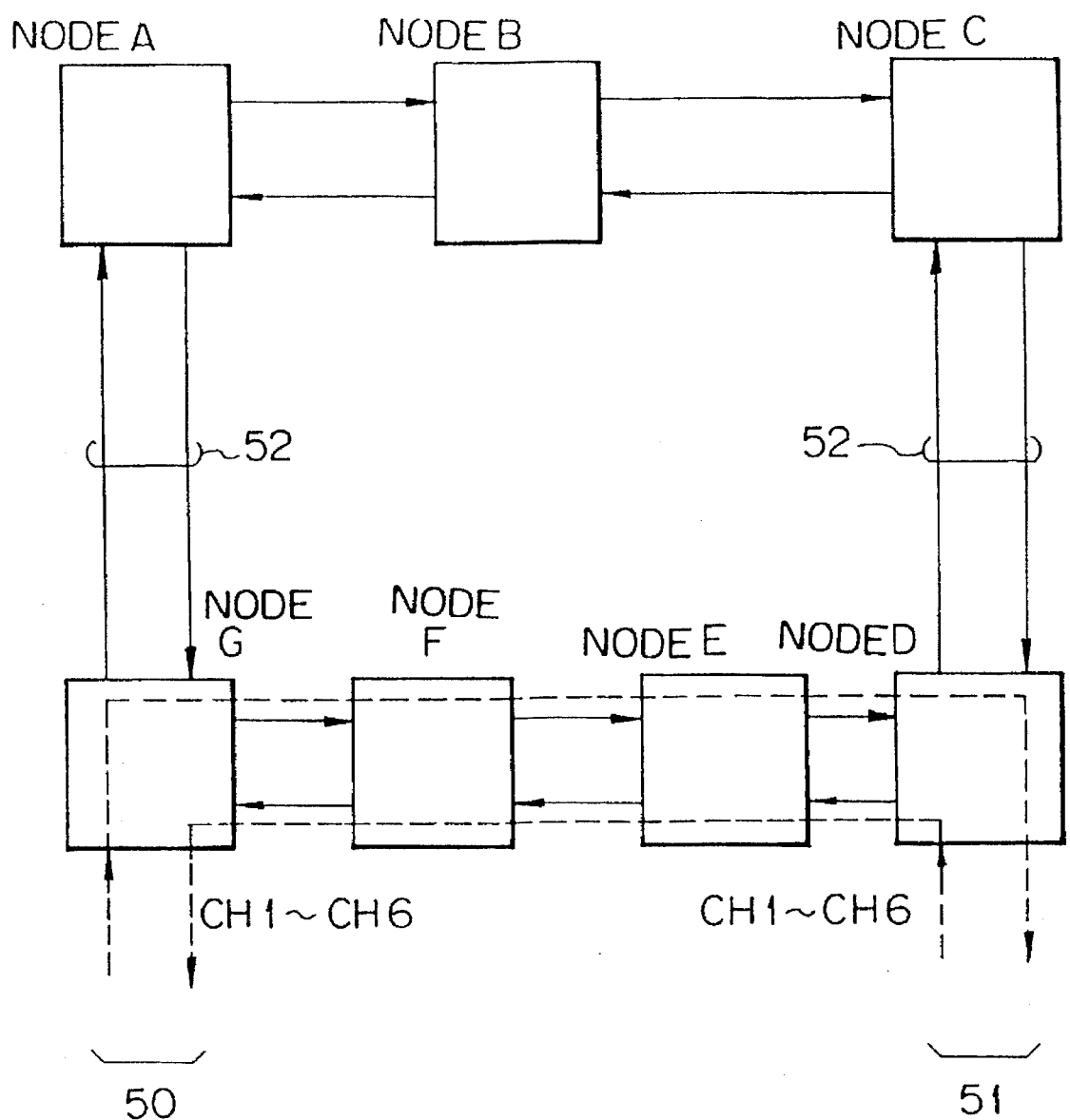
FIG. 1 is an explanatory view of the related art.

FIG. 1 is an explanatory view of the related art, and shows a bidirectional line switched ring network connecting seven nodes A to G by transmission lines 52 in a ring form. By the way, a greater number of nodes are connected in a practical bidirectional line switched ring network. In such a bidirectional line switched ring network, the transmission line 52 comprise two optical fibers, for example, and bidirectional communication can be carried out by standardized 2.4 Gbps OC-48 optical signals. Each of the nodes A to G is provided with a time slot replacing portion, etc., separates multiplexed signals, replaces a desired time slot by a time slot replacing portion, or branches it, and multiplexes and transmits a signal having a replaced time slot or a signal having a slot inserted thereto.

When communication is made between an end office 50 connected to the node G and another end office 51 connected to the node D by the use of channels CH1 to CH6, for example, paths indicated by dotted lines are formed between the nodes D, E, F and G. The signals of the channels CH1 to CH6 are inserted and multiplexed at the nodes G and D, or the signals of the channels CH1 to CH6 are separated from the multiplexed signal.

Figure 2:
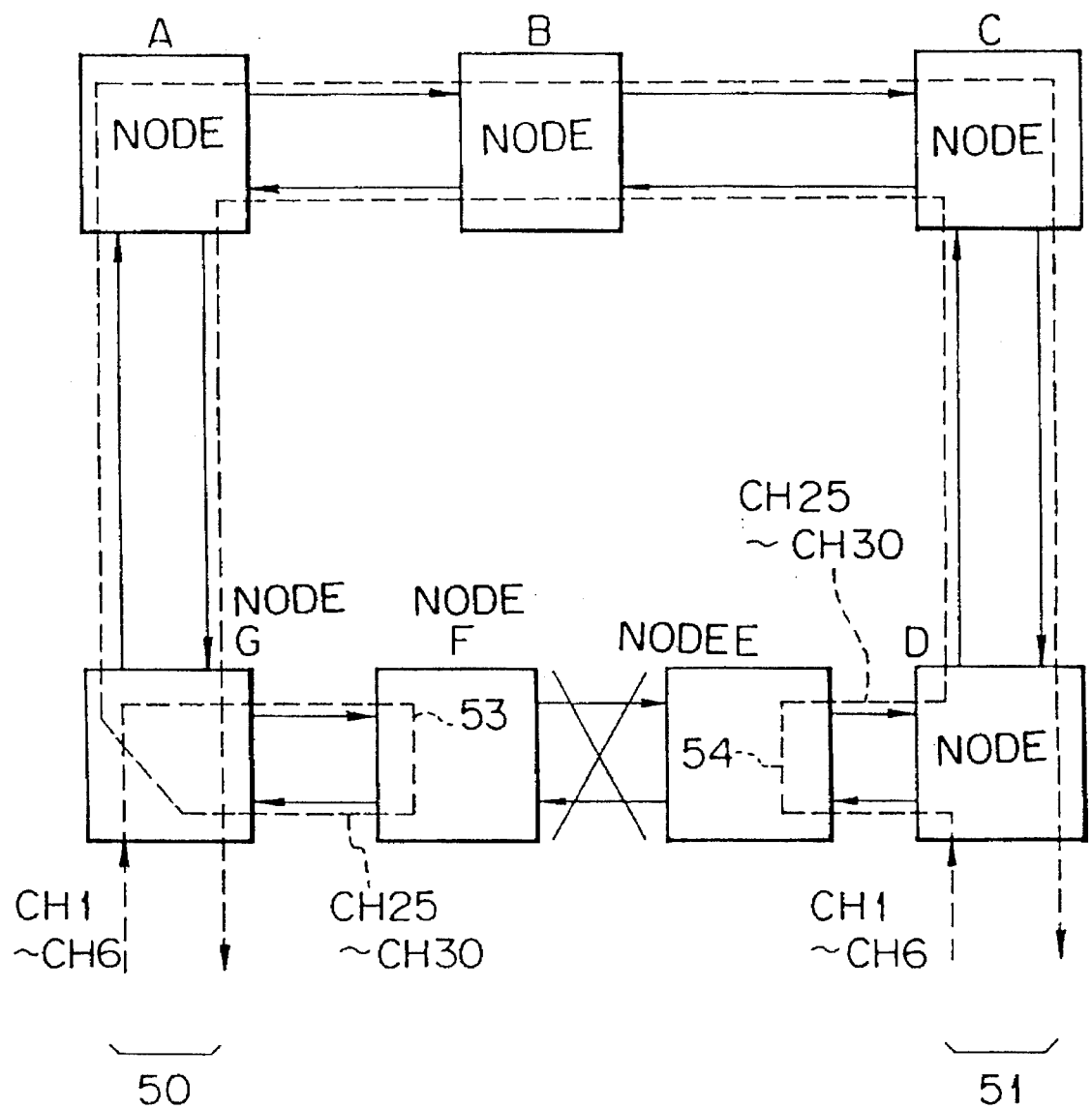
FIG. 2 is an explanatory view at the time of the occurrence of a trouble in the related art.

When a trouble indicated by symbol X occurs between the nodes E and F in FIG. 2 during the communication between the nodes G and D, for example, the nodes E and F on both sides of this trouble occurrence position exchange the message through the path extending thorough the nodes G, A, B, C and D due to this trouble detection, the node F forms a turn-back circuit 53, and the node E forms a turn-back circuit 54. These nodes F and E switch the channels CH1 to CH6 to the channels CH25 to CH30, for example, by the time slot replacing portions, etc., respectively. The channels CH25 to CH30 can be changed to the channels CH1 to CH6 by the replacement of the time slot at the nodes D and G. Accordingly, the communication between the end offices 50 and 51 can be continued by bypassing the trouble position between the nodes E and F, through the path indicated by the dotted lines in FIG. 2.

When no trouble exists in the network, each of the nodes A to G of the didirectional line switched ring network terminates the APS bytes of K1 and K2 bytes (see FIG. 6) of overhead of the multiplexed signal, and generates afresh and transmits the APS byte for signal transmission. At this time, the address of the next node is added, and this address mainly comprises the K1 byte. Each node also effects branching and insertion of payload, and changes the pointer of the overhead resulting from branching or insertion. When any trouble occurs in the network, the nodes on both sides of the trouble occurrence position form the turn-back circuit of the payload, while the other nodes perform the normal operation. In this case, the nodes on both sides of the trouble occurrence position must exchange the message and must form the turn-back circuit, and the APS byte containing the address for this message exchange must be passed through the other nodes.

Each node must normally terminate the APS byte, but when the trouble occurs as described above, each node must pass the APS byte for the message exchange. The pass treatment of his APS byte has been carried out by software in the related art. Accordingly, as the number of nodes becomes greater, the processing time at each node is accumulated, and the time necessary for relieving the trouble by forming the turn-back circuit is prolonged.

Next, a first embodiment of the present invention will be explained.

Figure 3:
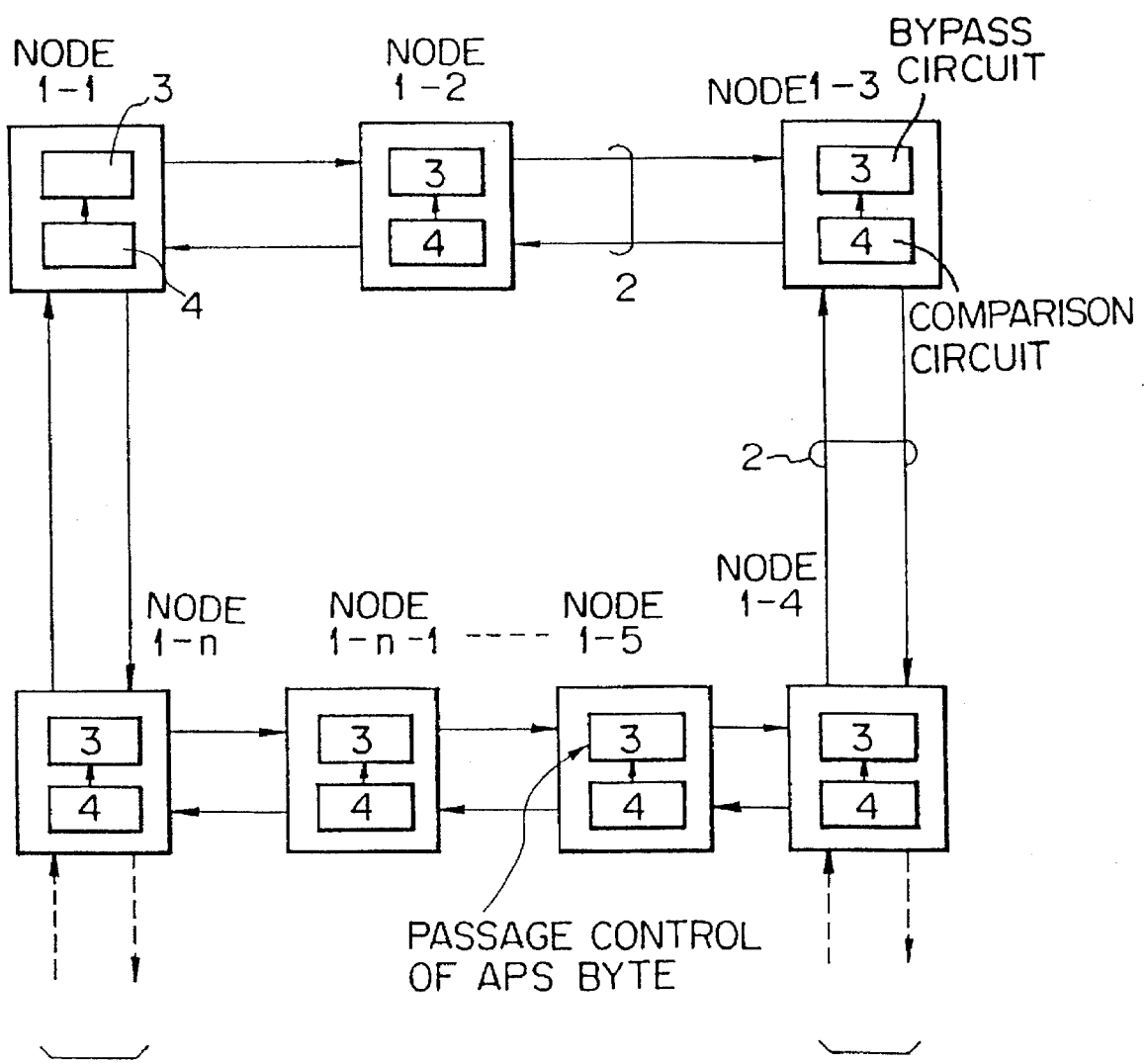
FIG. 3 is an explanatory view useful for explaining the principle of the present invention.

FIG. 3 is an explanatory view useful for explaining the principle of the present invention.

In a bidirectional line switched ring network which bidirectionally transmits a multiplexed signal by connecting in the ring form a plurality of nodes 1—1 to 1-n by transmission lines 2 and wherein each node 1—1 to 1-n normally sends an address contained in an APS byte by K1 and K2 bytes of overhead of the multiplexed signal as the address of the next node but sends the address of the node adjacent to a trouble when any trouble occurs, the control system of the bidirectional line switched ring network according to the present invention disposes a bypass circuit 3 for controlling whether or not the APS byte is passed through the nodes 1—1 to 1-n, and an address comparison circuit 4 for comparing and judging if the address contained in the APS byte coincides with its own address, wherein the address comparison circuit 4 closes the bypass circuit 3 to inhibit the passage of the APS byte when the address contained in the APS byte coincides with its own address, but opens the bypass circuit 3 to allow the passage of the APS byte when the address contained in the APS byte does not coincide with its own address.

The address comparison circuit 4 compares the address contained in the APS byte with its own address and can take control in such a fashion that it opens the bypass circuit 3 to allow the passage of the APS byte when the number of times of non-coincidence of these addresses continuously exceeds a plurality of times such as thrice, and when they coincide with each other, it closes the bypass circuit 3 and inhibits the passage of the APS byte.

Each of the nodes 1—1 to 1-n sets an idle state at a normal time where it terminates the APS byte and sends an APS byte afresh generated, a pass-through state at the time of the occurrence of the trouble where it passes the APS byte by the bypass circuit 3 and a switching state at the time of the occurrence of the trouble where it receives the APS byte and forms the turn-back circuit. When the address in the APS byte does not coincide with its own address at the time of the occurrence of the trouble, each node switches from the idle state to the pass-through state, and when the address in the APS byte coincides with its own address, a node switches from the idle state to the switching state.

The bypass circuit 3 and the address comparison circuit 4 are provided in each of the nodes 1—1 to 1-n, and the address comparison circuit 4 compares the address contained in the APS byte with its own address. Normally, each node 1—1 to 1-n generates the APS byte containing the address of the next node and sends this APS byte. Therefore, the next node compares the address contained in the APS byte with its own address, and they prove to be coincident. Accordingly, the node closes the bypass circuit 3 and the APS byte it receives, without passing it. Then, the node generates and sends a new APS byte. When any trouble occurs, on the other hand, the address in the APS byte for the message exchange is the address of one of the nodes on one side of the trouble occurrence position, and the address comparison circuit 4 of this other node compares this address with its own address. Since these addresses do not coincide at this time, the other node passes the APS byte through the bypass circuit 3. Accordingly, the APS byte can be transferred at a higher speed by hardware processing.

When non-coincidence between the address contained in the APS byte and the address of its own node continuously occurs three times, the address comparison circuit 4 judges that this does not result from the error of the address but Judges it as the APS byte due to the occurrence of the trouble, and opens the bypass circuit 3 to allow the passage of this APS byte. When the address contained in the APS byte coincides with the address of its own node, the address comparison circuit 4 judges that the trouble is repaired, and closes the bypass circuit 3 to inhibit the passage of the APS byte.

The idle state, the pass-through state or the switching state is provided to the nodes 1—1 to 1-n. Normally, the operation mode is the idle state in which the APS byte is terminated and the new APS byte is generated and sent. When the address by the APS byte does not coincide with the its own address at the time of the occurrence of the trouble, the operation mode is switched to the pass-through state where the APS byte is passed through the bypass circuit 3. When the address in the APS byte coincides with its own address, the operation mode is switched to the switching state where the turn-back circuit is formed so that the communication between the node can be maintained continuously by forming a path bypassing the position of the trouble.

Figure 4:
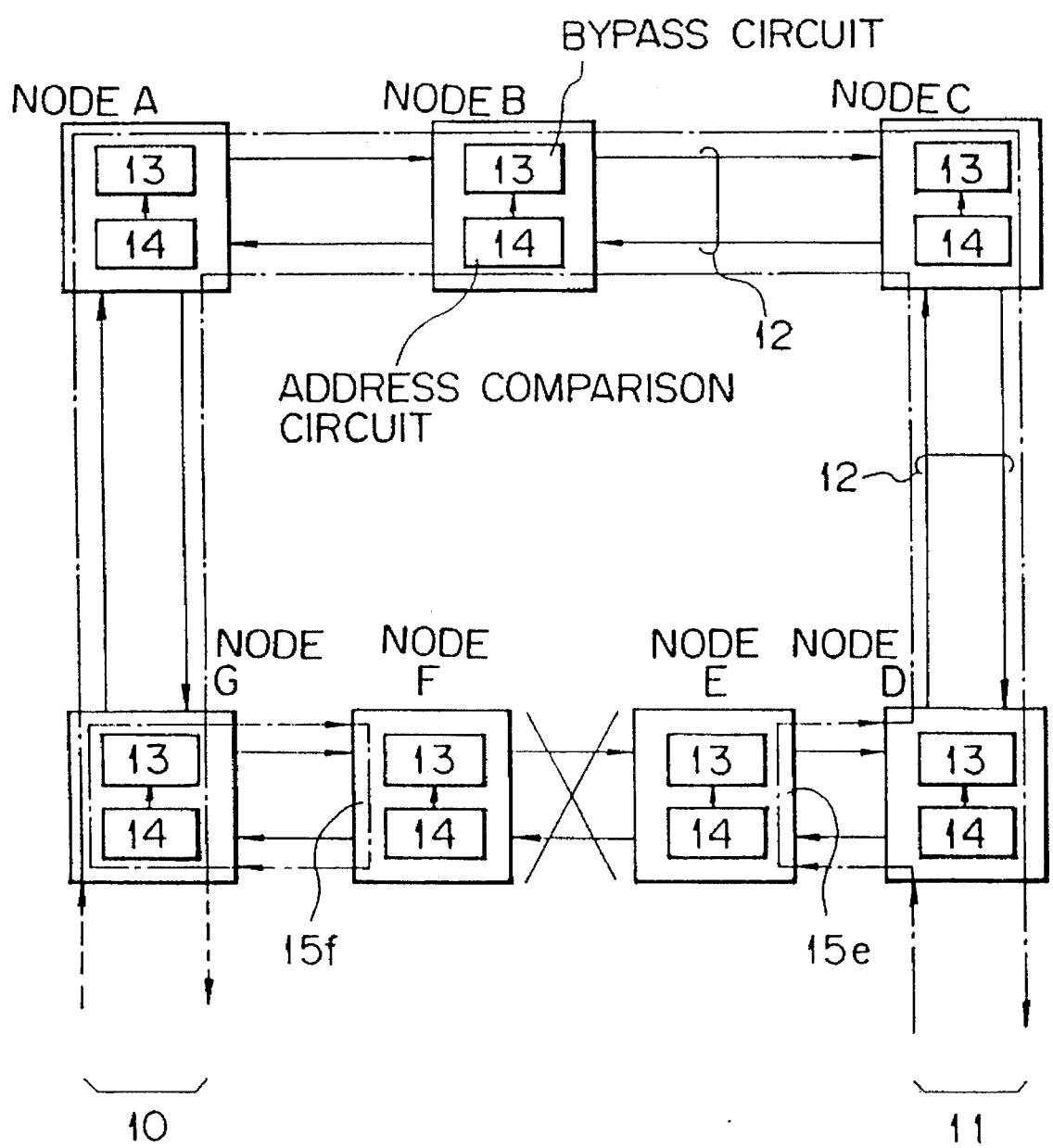
FIG. 4 is an explanatory view of an embodiment of the present invention.

FIG. 4 is an explanatory view of an embodiment of the present invention. Symbols A to G denote the nodes, reference numerals 10 and 11 denote end offices, 13 is the bypass circuit, 14 is the address comparison circuit, and 15e and 15f are the turn-back circuits. Each node A to G is provided with the time slot replacing portion, etc., and has structures for branching, insertion, etc. In the embodiment of the present invention, the bypass circuit 13 for the APS byte and the address comparison circuit 14 for comparing the address by the APS byte with its own address are further provided to each node.

The nodes A to G are connected in the ring form by the transmission lines 12 comprising two optical fibers, for example, and constitute the bidirectional line switched ring network as indicated by arrows. When communication is made between the end office 10 connected to the node G and the end office 11 connected to the node D, channels CH1 to CH6 are normally allocated between the nodes D, E, and G in accordance with the communication quantity in the same way as in the elated art so as to make communication.

Figure 5:
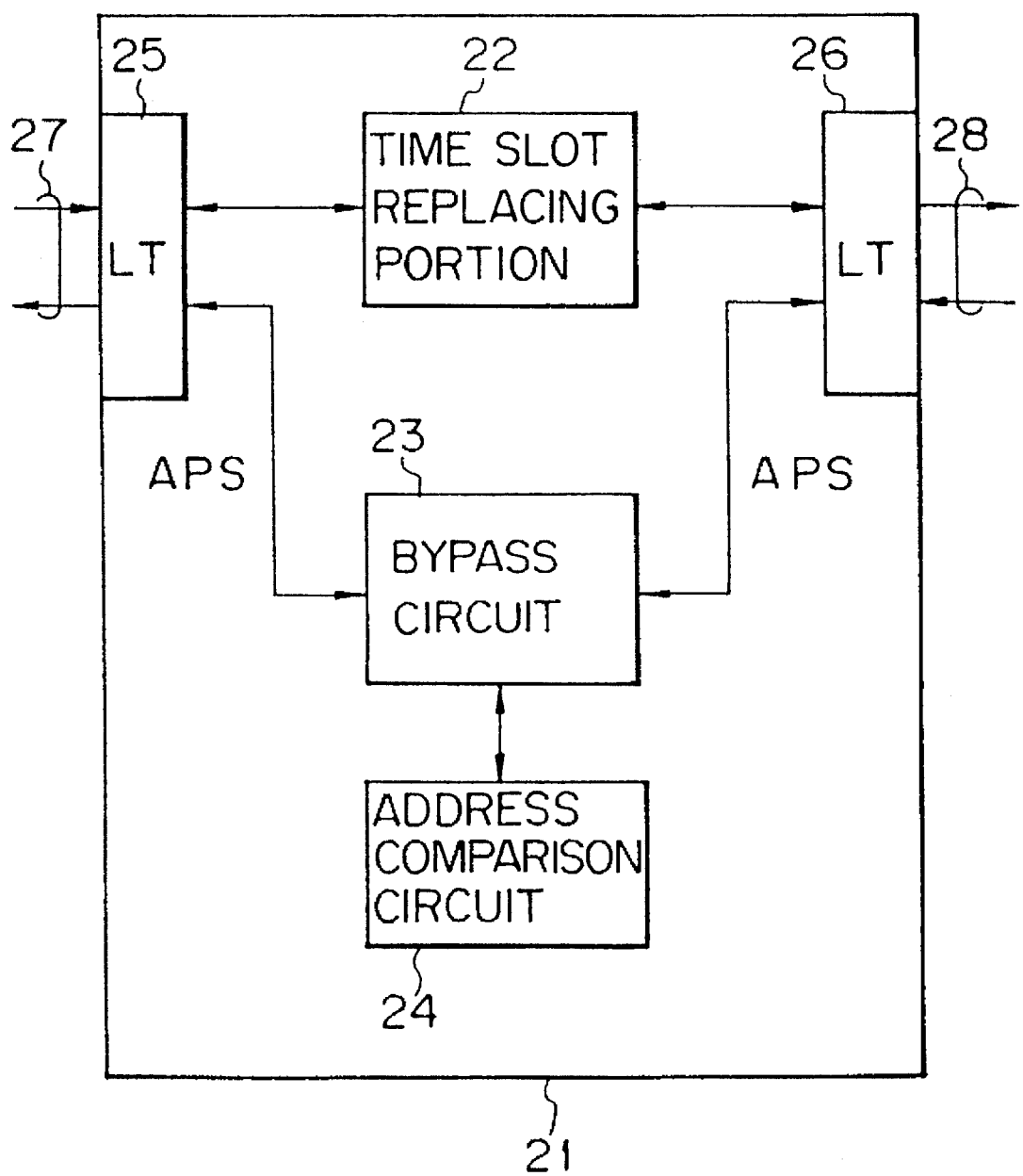
FIG. 5 is an explanatory view of the principal portions of node in an embodiment of the present invention.

FIG. 5 is an explanatory view of the principal portions of a given node in the embodiment of the present invention. The node 21 is provided with the time slot replacing portion 22 for replacing the time slot and for effecting branching and insertion, the bypass circuit 23 for the APS byte, the address comparison circuit 24, and line termination circuits (LTs) 25, 26. The node 21 is connected to other nodes by the transmission lines 28.

Figure 6:
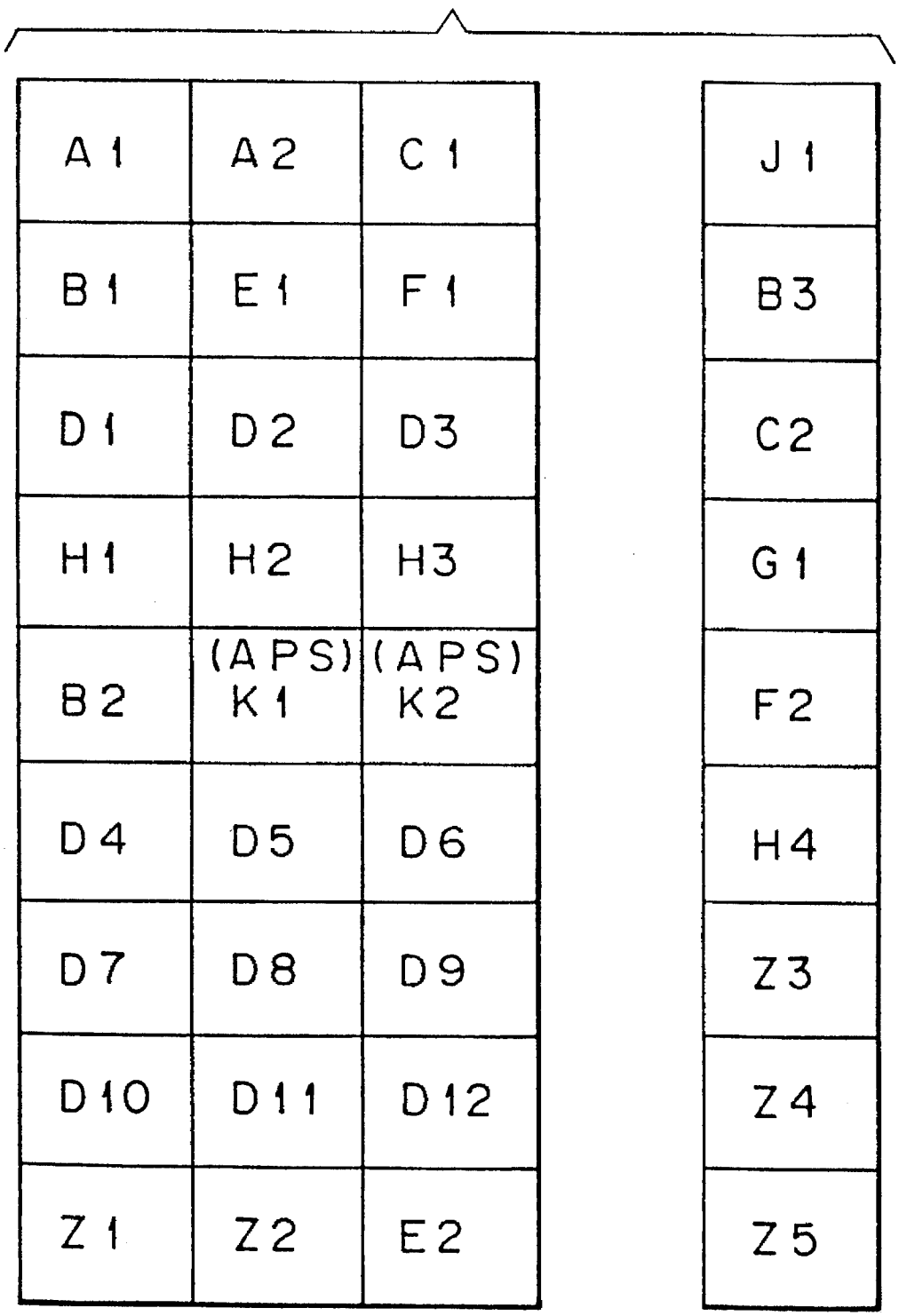
FIG. 6 is an explanatory view of overhead.

Each line termination circuit 25, 26 includes a photoelectric conversion portion for effecting mutual coversion between optical signals and electric signals, and has the function of separating the APS byte comprising the K1 and K2 bytes of the overhead of the multiplexed signal and adding it to the bypass circuit 23, and inserting the APS byte passing through the bypass circuit 23 or the APS byte generated afresh, into the overhead. The time slot replacing portion 22 has the function of separating the multiplexed signal and replacing the time slot, the function of branching and inserting the signal with the end office connected to the node of its own, and the function of forming the turn-back circuits (15e, 15f) at the time of the occurrence of the trouble, FIG. 6 is an explanatory view of the overhead, and shows an overhead of 3 bytes by 9 rows and the pass overhead of one byte by 9 rows. The outline of each byte is as follows. For example, A1 and A2 are frame sync bytes B1, B2 and B3 are error monitor bytes, C1 and C2 are identification number bytes, D1 to D12 are data bytes for relay sections or multiplex sections, E1 and E2 are order wire bytes, F1 and F2 are maintenance bytes, G1 is a state display byte, H1, H2 and H3 are pointer bytes, H4 is a multi-frame display byte, J1 is a channel byte for maintenance, K1 and K2 are APS bytes for representing the address, an alarm display signal AIS, etc., and Z1 to Z5 are spare bytes.

In the case of the multiplexed signal sent from the node A to the node B in FIG. 4, for example, the address of the node B is contained in the K1 and K2 APS bytes in the overhead. Accordingly, the frame sync bytes A1 and A2 are detected in the line termination circuit 25 at the node B, for example, so as to establish frame synchronization, and the APS bytes of the overhead are separated and applied to the bypass circuit 23. The address comparison circuit 24 compares its own address with the address contained in the APS byte. Since these addresses coincide with each other in this case, the bypass circuit 23 is closed and this APS byte is received. The node B generates a new APS byte containing the address of the next node C and sends this new APS byte. In other words, each node A to G normally received the APS byte and sends a new APS byte to the next node.

When any trouble occurs between the nodes E and F as indicated by symbol X in FIG. 4, the nodes E and F send the alarm indication signal (AIS) and the far end receive failure signal FERM, by the APS byte, upon signal breakage detection or error rate increase detection, one (E) of these nodes sends the address by this APS byte as the address of the other node (F) and the other node too, sends is as the address of the node (E).

Accordingly, when the comparison circuit 24 compares the address by the reception APS byte with its own address at each of the nodes A, B, C, D and G other than these nodes E and F, the comparison results proves non-coincident. Therefore, it opens the bypass circuit 23 and passes the reception APS byte through this bypass circuit 23. The node F can receive the APS byte from the node E while the node E can receive the APS byte from the node F. In other words, it is possible to transmit the APS byte at the time of detection of the trouble between the nodes A, B, C, D and G through the bypass circuit 23 other than the nodes E and F which interpose the position of occurrence of the trouble between them. In other words, it is possible to speed up the message exchange between the nodes E and F, to form the turn-back circuits 15e, 15f between the nodes E and F, and to continue the communication between the end offices 10 and 11 through the path which bypasses the trouble position and is indicated by chain lines.

The states of nodes include the idle state where the bidirectional line switched ring network operates normally, the switching state where the nodes sandwiching the position of the occurrence of the trouble form the turn-back circuits hen the trouble occurs, and the pass-through state where the other nodes allow the passage of the APS byte. When the trouble occurs, the nodes on either side of the position of the occurrence of the trouble make the message exchange between them. Therefore, the other nodes quickly shift from the idle state to the pass-through state. If this shift is attained by the software processing, the processing time is accumulated at each node, and the message exchange between the nodes for shifting to the switching state will be retarded.

In the embodiment described above, however, the APS byte at the time of the occurrence of the trouble is passed by the hardware inclusive of the bypass circuit 23, and the shift from the normal state to the pass-through state can be made quickly. Accordingly, the failure relief processing can be sped up and the communication cut-off time can be reduced.

Figure 7:
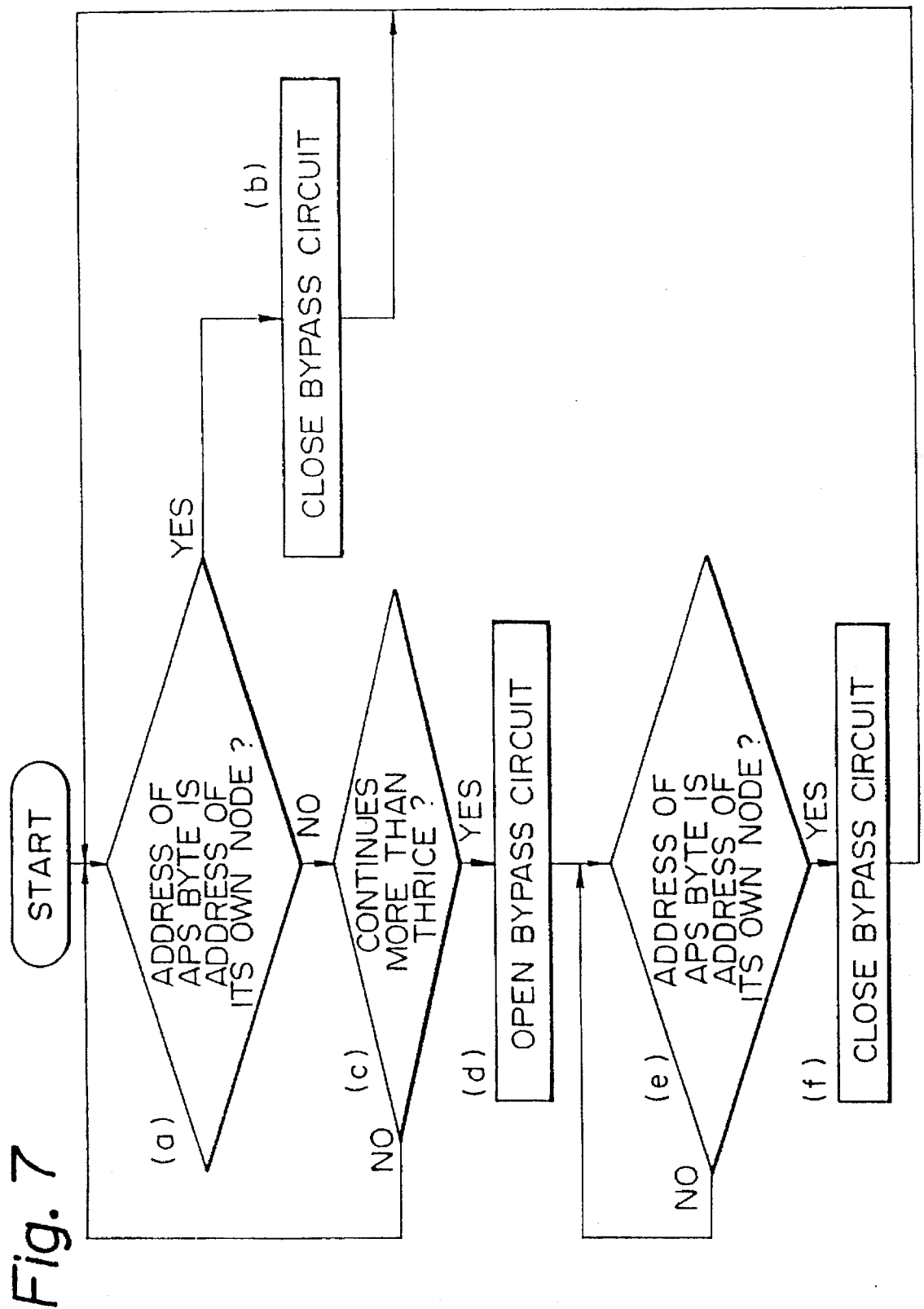
FIG. 7 is a flowchart of an embodiment of the present invention.

FIG. 7 is a flowchart of the embodiments of the present invention. Whether or not the address of the APS byte is the address of its own node is judged by the address comparison circuit 24(a), and the bypass circuit 23 is closed to receive the APS byte when it is the address is own node (b). When it is not the its own address, whether or this non-coincidence continues three times is judged (c) because there is the possibility of an address error. When it does, it means the occurrence of a trouble. Then, the bypass circuit 23 is opened to pass the APS byte (d) and sends the address to the next node. In other words, the state shifts from the normal state to the pass-through state at this node.

When the trouble is restored, the address of the APS byte is used as the address of the next node. Therefore, even after the bypass circuit 23 is opened, the address comparison circuit 24 judges whether or not the address of the APS byte is the its own address (e). When the address is its own, the bypass circuit 23 is closed (f), and the APS byte is received. In other words, the state shifts from the pass-through state to the normal state at this node.

Figure 8:
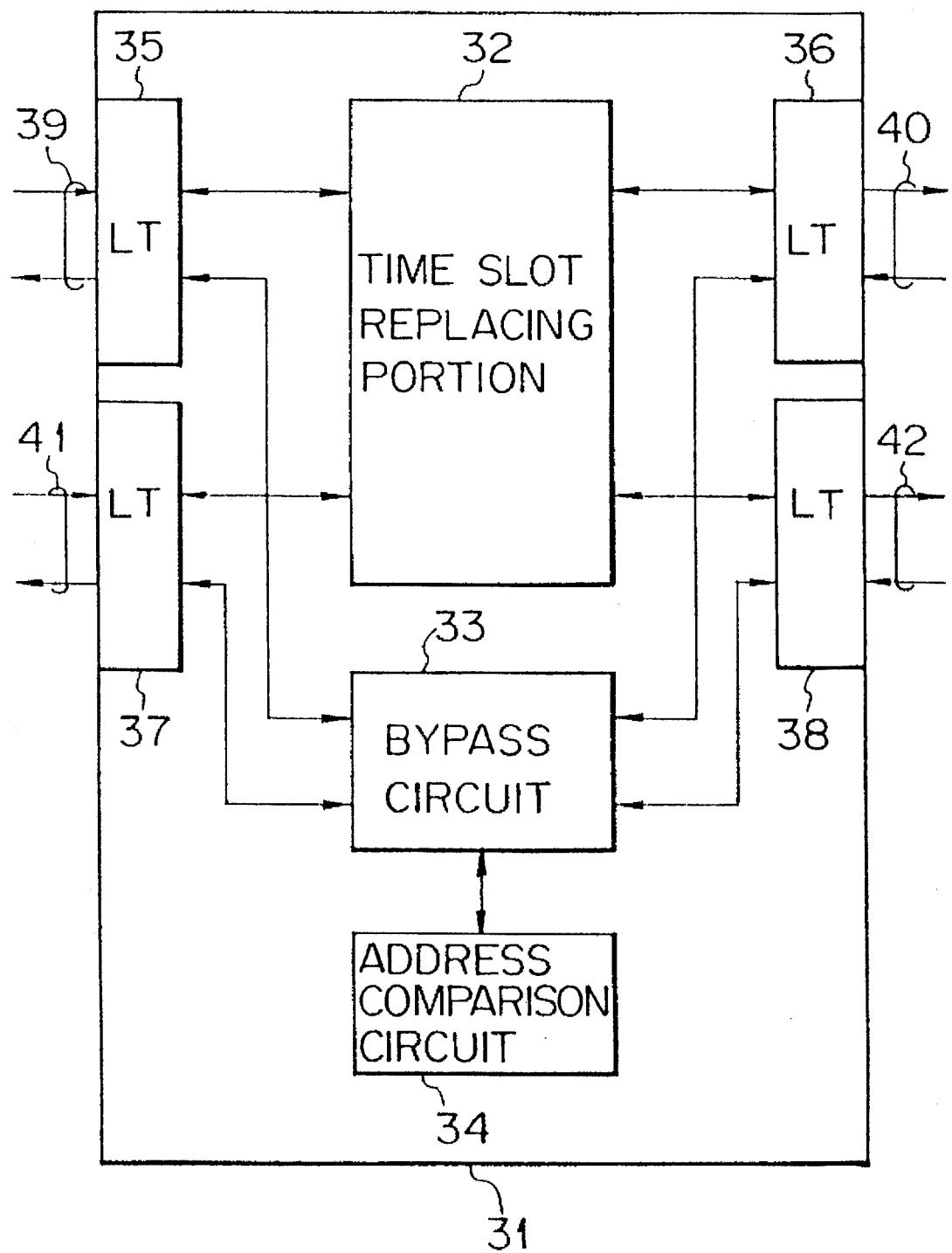
FIG. 8 is an explanatory view of the principal portions of the nodes in another embodiment of the present invention.

FIG. 8 is an explanatory view of the principal portions of a node in another embodiment of the present invention. Reference numeral 31 denotes the node, 32 is the time slot replacing portion, 33 is the bypass circuit, 34 is the address comparison circuit, 35 to 38 are the lines termination circuits (LTs), and 39 to 42 are the transmission lines. The foregoing embodiment shown in FIG. 5 shows the case where the transmission lines 27, 28 comprise two optical fibers, respectively, for affecting bidirectional communication, but this embodiment represents the case where the nodes 31 are connected in the ring form by the transmission lines 39 to 42 each comprising the two optical fibers. The number of optical fibers connecting the nodes 31 can further be increased.

In this embodiment, the line termination circuits 35 to 38 are so disposed as to correspond to the transmission lines 39 to 42, respectively. Each of them separates the APS bytes from the overhead of the multiplexed signal, applies than to the bypass circuit 33 and inserts the APS bytes passing through this bypass circuit 33 or the APS bytes generated afresh into the overhead of the multiplexed signal. The time slot replacing portion 32 executes replacing of the time slot between the transmission lines 39, 41 and the transmission lines 40, 42 and the branching and insertion processing of the time slot.

Since each node receives the APS byte containing its own address during normal operation, the bypass circuit 33 is kept closed, and the received APS byte is discarded. When the trouble occurs, the nodes other than the nodes on both sides of the position of the occurrence of the trouble receive the APS byte not containing heir own addresses, so that the bypass circuit 33 is opened and the APS byte is passed. Accordingly, the message exchange between the nodes on both sides of the position of the occurrence of the trouble can be sped up.

Figure 9:
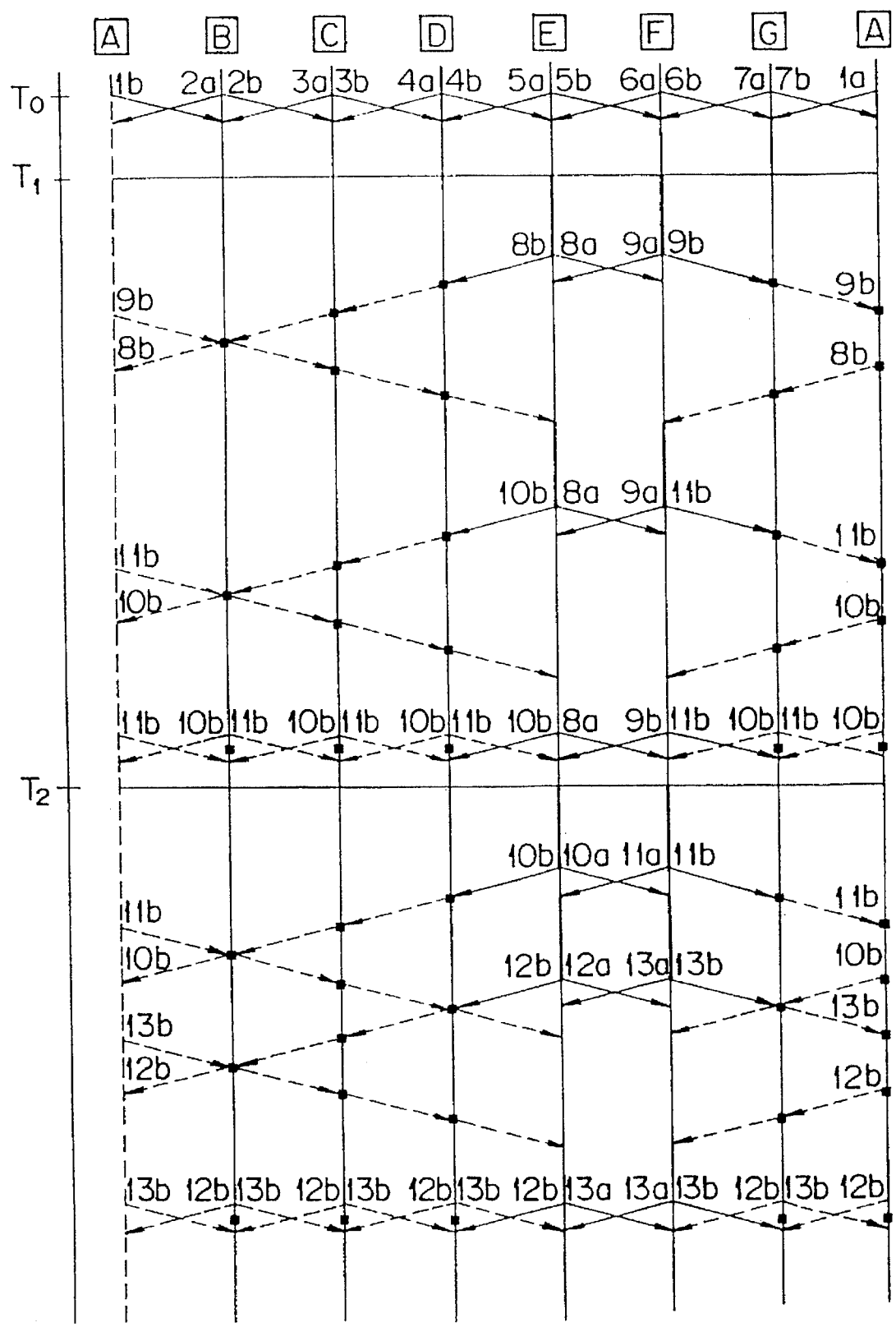
FIG. 9 is a sequence chart of another embodiment of the present invention
Figure 10:
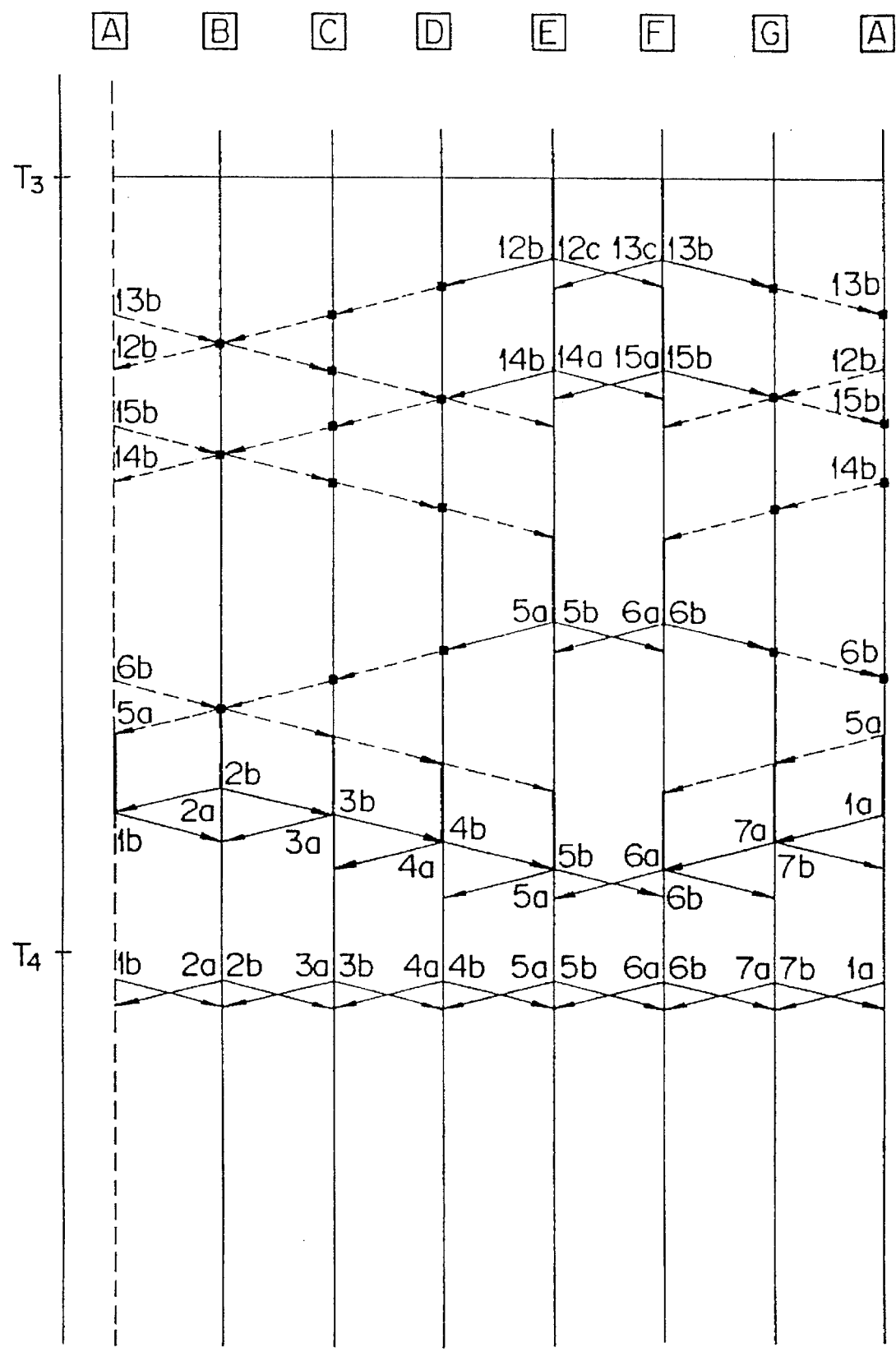
FIG. 10 is a sequence chart of another embodiment of the present invention.

FIGS. 9 and 10 are sequence charts of the embodiment of the present invention. Symbols A to G correspond to the nodes A to G shown in FIG. 4. Symbol To represents the normal time and T1 does the occurrence of the trouble. Symbol T2 represents the trouble restoration and T3 does the return to the normal time after the passage of the restoration protection time. T4 represents the case where the condition returns to the normal time after the passage of the restoration protection time. Reference numerals 1a, 1b to 15a, 15b, 12c, 13c represent signals in the APS byte.

Figure 11:
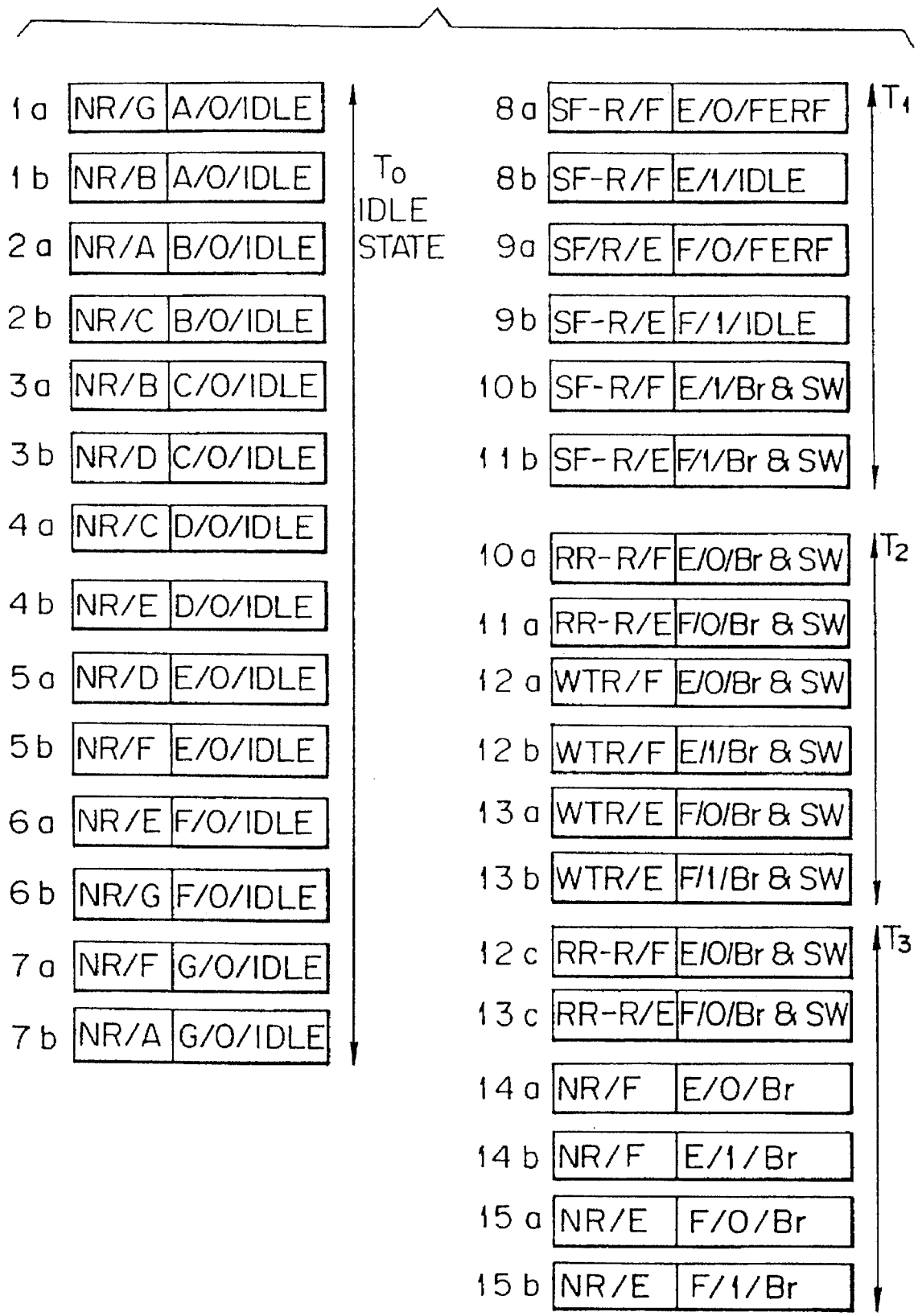
FIG. 11 is an explanatory view of signals in the embodiments of the present invention.

FIG. 11 is an explanatory view of the signals and shows the contents of the signals 1a, 1b to 15a, 15b, 12c and 13c by the afore-mentioned APS byte at T0 to T3 shown in FIGS. 9 and 10. "NR/G" to "NR/A" of the former half of the signals 2a, 1b to 7a and 7b delivered by the nodes A to G in the idle state at the first To represent "no request" to which the address of the next node G to A is added. "A/0/IDLE" to "G/0/IDLE" of the latter half represent that the nodes A to G are by themselves in the idle state.

Accordingly, when the bidirectional line switched ring network is under the normal operation, the APS byte to which the address of the next node is added is outputted under the idle state at To in FIG. 9. For example, the node E sends the signal 5b (NR/F E/0/IDLE), to which the address of the next node F is added, to the node F. Since the address of the signal 5b received represents its own address, the address comparison circuit of the node F closes the bypass circuit and discards the received APS byte. Then, the node F sends the signal 6b (NR/G F/0/IDLE), to which the address of the node G is added, to the node G. This also holds true for the other nodes, and each of the nodes A to G sends the corresponding signal 1a to 7a in the left-hand direction and the signal 1b to 7b in the right-hand direction.

When any trouble occurs between the nodes E and F at T1 and the nodes E and F detect this trouble, the node E sends the signals 8a, 8b, to which the address of the node F is added, while the node F sends the signals 9a, 9b, to which the address of the node E is added. If the trouble in this case is disconnection of the line, the signals 8a and 9a cannot be received by the counter-part node, but if it is an increase in the error rate due to deterioration of line quality, there signals may be received by the counter-part node.

These signals 8a, 9b, 9a and 9b are "SF-R/F E/0/FERF", "SF-R/F E/1/IDLE", "SFR/E F/0/FERF" and "SF-R/E F/1/IDLE", respectively, as shown in FIG. 11. Symbol "SF" in this case means an SF ("signal failure") signal representing signal failure, etc., and symbol "FERF" means a far end receive failure signal.

Since the address of the node F is added to the signal 8b sent from the node E to the node D, the node D receives the APS byte containing the address which does not coincide with its own address and is added to the APS byte. Accordingly, the node D opens the bypass circuit and passes this APS byte as described already. The other nodes C, A and G passes this APS byte in the same way as the node D, and the node P can thus receive the signal 8b from the node E. Since the address of the node E is added to the signal 9b sent from the node F to the node G, the APS byte passes through the nodes G, A, B, D and D, and the node E can thus receive the signal 9b from the node F.

Receiving the signal 9b from the node F, the node E forms a turn-back circuit (15e in FIG. 4) and sends the signal 10b to the node D. Receiving the signal 8b from the node E, the node F forms the turn-back circuit (15f in FIG. 4) and sends the signal 11b to the node G. These signals "10b, 11b are "SF-R/F E/1/Br&SW" and "SF-R/E F/1/Br&SW", respectively, as shown in FIG. 9, and the symbol "Br&SW" represents the switching state in which the turn-back circuit (15e, 15f) is formed. In connection with the signals 10b and 11b from the nodes E and F in this case, the other nodes A, B, C, D and G are in the pass-through state.

Accordingly, communication between the end offices 10 and 11 connected to the nodes G and D is continued by the path detouring the position of the trouble. The signal 10b from the node E is sequentially sent to the node F through the nodes D, C, B, A and G, and the signal 11b from the node F is sequentially sent to the node E through the nodes G, A, B, C and D.

When the trouble between the nodes E and F is restored at T2, the node E sends the afore-mentioned signal 10b to the node D and sends the signal 10a, to which the address of the node F is added, to the node F. The node F sends the above-mentioned signal 11b to the node G and node G sends the signal 11a, to which the address of the node E is added, to the node E. These signals 10a and 11a are "RR-R/F/E/0/Br&SW" and "RR-R/E F/0/Br&SW", respectively, as shown in FIG. 11. The symbol "RR" in this case means a ring request, and the signals 10b, 11b pass through the other nodes in the same way as before, so that transmission of the signals 10b, 11b is continuously carried out until the trouble is restored.

Receiving the signal 11a from the node F due to the restoration of the trouble, the node E activates the timer which sets the restoration protection time WTR. Receiving the signal 10a from the node E, the node F likewise activates the timer which sets the restoration protection time WTR. The timer in this case may be any of software timers or hardware timers for counting clock signals, or other tamers for monitor can also be used. Then, the nodes E, F send the signals 12a, 12b, 13a, 13b. These signals 12a, 12b, 13a, 13b are "WTR/F E/0/Br&SW", "WTR/F E/1/Br&SW", "WTR/E F/0/BR&SW" and "WTR/E F/1/Br&SW", respectively, as shown in FIG. 11.

The signal 12b is transmitted repeatedly from the node E to the node F through the nodes D, C, B, A and G which are in the pass-through state, and the signal 13b, too, is transmitted repeatedly from the node F to the node E through the nodes G, A, B, C and D which are in the pass-through state. The signals 12a and 13a are transmitted and received between the nodes E and F.

When the set time of the timer is reached at T3 or in other words, when the restoration protection time WTR finishes, the node E sends the signal 12c having the address of the node F added thereto, while the node F sends the signal 13c having the address of the node E added thereto. These signals 12c, 13c are "RR-R/F E/0/Br&SW" and "RR-R/E F/0/Br&SW", respectively, as shown in FIG. 9, and are the same as the signals 10a and 11a.

Receiving the signal 13c, the node E restores the turn-back circuit (15e), sends the signal 14b having the address of the node F added thereto to the node D, and sends the signal 14a to the node F. Receiving the signal 12c, the node F restores the turn-back circuit (15f), sends the signal 15b having the address of the node E added thereto to the node G and sends the signal 15a to the node E. These signals 14a, 14b, 15a and 15b are "NR/F E/0/Br", "NR/F E/1/Br", "NR/E F/0/Br" and "NR/E F/1/Br", respectively, as shown in FIG. 11.

Receiving the signal 15b, the node E shifts to the idle state, and receiving the signal 14b, the node F, too, shifts to the idle state. The other nodes A, B, C, D and G sequentially shift from the pass-through state to the idle state and enter the T4 period which is similar to the idle state of T0. Then, the signals 1a, 1b to 7a and 7b are sent from the corresponding nodes A to G. In other words, the APS byte is received by each node A to G, and a new APS byte is sent to the next node.

As described above, the present invention provides each node 1—1 to 1-n with the bypass circuit 3 for controlling whether or not the APS byte is to be passed, and with the address comparison circuit 4 which compares the address by the APS byte with its own address, closes the bypass circuit to terminate the received APS byte when they do not coincide but opens the bypass circuit 4 so as to allow the passage of the APS byte when they coincide with each other. Accordingly, the present invention can quickly pass the APS byte sent from the trouble detection node through a simple construction. In other words, the present invention provides the advantage that the communication cut-off time can be reduced by forming a turn-back circuit capable of bypassing the position of a trouble.

We claim:

1. A bidirectional line switched ring BLSR network control system for bidirectionally transmitting multiplexed signals by connecting a plurality of nodes in a ring form by transmission lines, wherein in normal operation each of said nodes sends an address, contained in an automatic protection switching APS byte conveyed by K1 and K2 bytes of overhead of a multiplexed signal, to a subsequent node by changing said address to an address of the subsequent node, and when detecting trouble in a transmission line between two nodes, each node adjacent said trouble sends an address to the opposed node in trouble via a turn-back circuit for connection to a transmission line in the reverse direction, the address being that of the opposed node normally connected thereto via said troubled transmission line, said ring including means for detecting trouble in a transmission line, wherein:

each of said nodes includes a bypass circuit for controlling whether or not said APS byte received from a preceding node is to be passed to a subsequent node, and an address comparison circuit having a respective current node address, said comparison circuit comparing the address contained in said APS byte with said current node address; and said address comparison circuit closes said bypass circuit to inhibit the passage of said APS byte when the address contained in said APS byte coincides with said current node address, and opens said bypass circuit to allow passage of said APS byte when said addresses do not coincide with each other.

2. a bidirectional line switched ring network control system according to claim 1, wherein each of said address comparison circuits compares the address contained in said APS byte with its own node address, opens said bypass circuit to allow passage of said APS byte when non-coincidence with its own node address continues for a plurality of times, and closes said bypass circuit so as to inhibit the passage of said APS byte when said address in said APS byte and said node address coincide with each other.

3. A bidirectional line switched ring network control system according to claim 2, wherein the number of times of non-coincidence between the address contained in said APS byte and the node address compared by said address comparison circuit is three or more consecutive times.

4. A bidirectional line switched ring network control system according to claim 1, wherein each of said nodes has an idle state in normal operation in which said APS byte having a current node address is received from a preceding node and a new APS byte having a subsequent node address is generated and sent to a next node, a pass-through state at a time of a trouble occurring in a transmission line in which said APS byte is passed through the current node by said bypass circuit, and a switching state at the time of the occurrence of the trouble in which said APS byte received from a preceding node is turned back to the preceding node by forming a turn-back circuit, each node switches said idle state to said pass-through state when the address in said APS byte received from a preceding node does not coincide with the current node address in said address comparison circuit, and switches state when detecting the trouble and the address in said received APS byte coincides with the current node address.

5. A bidirectional line switched ring network control apparatus in a bidirectional line switched ring network BLSR utilizing SONET, comprising:

a line termination circuit for terminating ring-like transmission lines, effecting mutual conversion between an optical signal and an electric signal, separating an automatic protection switching APS byte conveyed by K1 and K2 bytes in the overhead of a multiplexed signal bidirectionally transmitted through said transmission lines, and inserting said APS byte or new APS byte into the overhead of said multiplexed signal;

a time slot replacing section for effecting replacement and branching of a time slot of a signal terminated by said line termination circuit, effecting branching and insertion of a signal from an end office connected to a current node, and forming a turn-back circuit to turn said APS byte received from a preceding node back to processing node;

a bypass circuit for bypassing said APS byte provided by said line termination circuit; and an address comparison circuit for comparing an address contained in said APS byte from said bypass circuit with the address of the current node, closing said bypass circuit to inhibit the passage of said APS byte when the address contained in said APS byte coincides with the current node address, and opening said bypass circuit to allow the passage of said APS byte when said address of said current node and said APS address do not coincide with each other and further directing formation of said turn-back circuit in said time slot replacing section if detecting a trouble of said transmission lines connected to the current node.

6. A bidirectional line switched ring network control apparatus according to claim 5, wherein said address comparison circuit compares the address contained in said APS byte with the current node address, opens said bypass circuit to allow the passage of said APS byte when non-coincidence between them continues a plurality of times, and closes said bypass circuit to inhibit the passage of said APS byte when said addresses coincide with each other.

7. A bidirectional line switched ring network control apparatus according to claim 6, wherein the number of times of non-coincidence between the address contained in said APS byte and the address of the current node compared by said address comparison circuit is more than three consecutive times.

8. A bidirectional line switched ring network control apparatus according to claim 5, wherein said line termination circuit comprises a plurality of sets of said line termination circuit corresponding to a plurality of transmission lines, and said time slot replacing portion, said bypass circuit and said address comparison circuit execute multiplexing processing of signals from said sets of line termination circuits, respectively.

9. A bidrectional line switched ring network control apparatus according to claim 8, wherein said address comparison circuit compares the address contained in said APS byte with the current node address, opens said bypass circuit to allow the passage of said APS byte when non-coincidence between them continues a plurality of times, and closes said bypass circuit to inhibit the passage of said APS byte when said APS address and said current node address coincide with each other.

10. A bidirectional line switched ring network control apparatus according to claim 9, wherein the number of times of non-coincidence between the address contained in said APS byte and the current node address compared by said address comparison circuit is more than three consecutive times.

11. A control method of a bidirectional line switched ring network for the time of the occurrence of a trouble of a bidirectional line switched ring network control apparatus in a bidirectional line switched ring network BLSR utilizing SONET, comprising:

a step of judging coincidence/non-coincidence between an address of an APS byte by K1 and K2 bytes in the overhead of a multiplexed signal bidirectionally transmitted through ring-like transmission lines by an address comparison circuit;

a step of closing a bypass circuit for controlling the passage of said APS byte so as to inhibit the passage of said APS byte when the address contained in said APS byte coincides with a current node address, and providing an address of a subsequent node to said APS byte, conversely opening said bypass circuit to allow the passage of said APS byte to a subsequent node when the address contained in said APS byte does not coincide with the current node address; and a step of further judging coincidence/non-coincidence of the address of said APS byte and said current node address by said address comparison circuit after said bypass circuit is opened and closing said bypass circuit for controlling the passage of said APS byte so as to inhibit the passage of said APS byte when the address contained in said APS byte coincides with said current node address, and providing the address of the subsequent node.

12. A bidirectional line switched ring network control method according to claim 11, wherein judgement of non-coincidence in the comparison of the address contained in said APS byte with the current node address is made when non-coincidence continues a plurality of times.

13. A bidirectional line switched ring network control method according to claim 12, wherein the number of times of non-coincidence between the address contained in said APS byte and the current node address is more than three consecutive times.

14. A bidirectional line switched ring network control method according to claim 11, wherein the nodes on both sides of the trouble line respectively form a turn-back circuit constituting a turn-back loop for transmission and reception when the address contained in said APS byte and a current node address coincide at the time of detection of the trouble and when a failure signal representing a signal failure is received, and thereafter said nodes on both sides of the trouble release said respective turn-back circuit upon reception of a subsequent circuit restoration signal.

15. A bidrectional lines switched ring network control method according to claim 14, wherein the release of said turn-back circuit is effected after the passage of a predetermined restoration time starting from detection of said restoration signal.

* * * * *